No. 752,784. PATENTED FEB. 23, 1904.
M. E. KNIGHT.
ROTARY ENGINE.
APPLICATION FILED APR. 11, 1903.
NO MODEL. 6 SHEETS—SHEET 1.

WITNESSES.
Frank G. Parker
John Buckley

INVENTOR.
Margaret E. Knight

No. 752,784. PATENTED FEB. 23, 1904.
M. E. KNIGHT.
ROTARY ENGINE.
APPLICATION FILED APR. 11, 1903.
NO MODEL. 6 SHEETS—SHEET 3.

WITNESSES.
John Buckler
Frank G. Parker.

INVENTOR.
Margaret E. Knight

No. 752,784. PATENTED FEB. 23, 1904.
M. E. KNIGHT.
ROTARY ENGINE.
APPLICATION FILED APR. 11, 1903.
NO MODEL. 6 SHEETS—SHEET 4.

WITNESSES.
Frank G. Parker
John Buckler

INVENTOR.
Margaret E. Knight

No. 752,784. PATENTED FEB. 23, 1904.
M. E. KNIGHT.
ROTARY ENGINE.
APPLICATION FILED APR. 11, 1903.
NO MODEL. 6 SHEETS—SHEET 5.

WITNESSES.
Frank G. Parker
John Buckler

INVENTOR.
Margaret E. Knight

No. 752,784. PATENTED FEB. 23, 1904.
M. E. KNIGHT.
ROTARY ENGINE.
APPLICATION FILED APR. 11, 1903.
NO MODEL. 6 SHEETS—SHEET 6.

WITNESSES.
Frank G. Parker
John Buckler

INVENTOR.
Margaret E. Knight

No. 752,784.                                            Patented February 23, 1904.

UNITED STATES PATENT OFFICE.

MARGARET E. KNIGHT, OF SOUTH FRAMINGHAM, MASSACHUSETTS.

ROTARY ENGINE.

SPECIFICATION forming part of Letters Patent No. 752,784, dated February 23, 1904.

Application filed April 11, 1903. Serial No. 152,279. (No model.)

*To all whom it may concern:*

Be it known that I, MARGARET E. KNIGHT, of South Framingham, in the county of Middlesex and State of Massachusetts, have invented certain Improvements in Rotary Engines, of which the following is a specification.

This invention relates to rotary engines; and it consists chiefly in the novel construction of the pistons and piston-chamber and in the mode of operation of the pistons, which are constructed to slide radially of a rotary carrier and are forced outward therein by the admission of steam back of or under the inner ends of the pistons, which thrust their outer ends against the interior surface of the piston-chamber in a direction which is angularly inclined to the normal of that surface at each point thereof during the outward movement in each reciprocation of the pistons and by this end thrust of the piston cause it to slide over the surface of its chamber, which is formed in curves the tangents of which are at right angles to the line of thrust of the piston only when that line is coincident with the major and minor axes of the ellipsoidal interior. The admission of steam is regulated to act upon each piston and force it outward during its passage over alternate quarter-sections of the periphery of the interior of the chamber. During the passage of the pistons over the other alternate quarter-sections the steam is exhausted and the pistons are pushed inward through contact with the walls of the chamber.

The construction and operation will be more fully understood by reference to the following description, in connection with the accompanying drawings, wherein—

Figure 1:
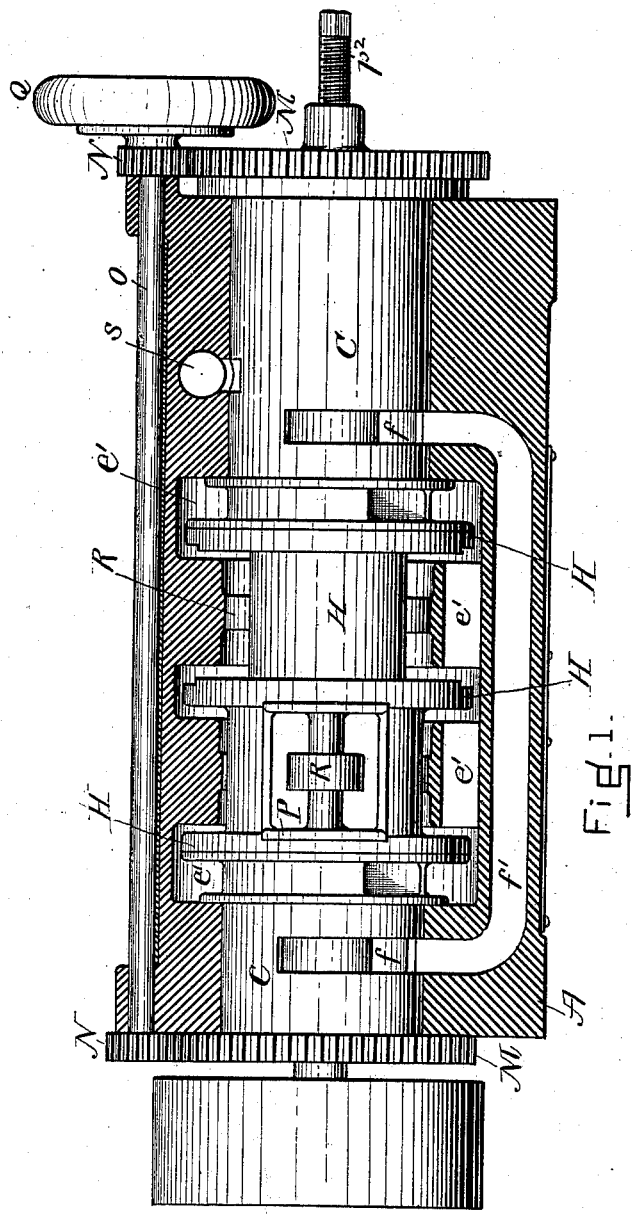
Figure 2:
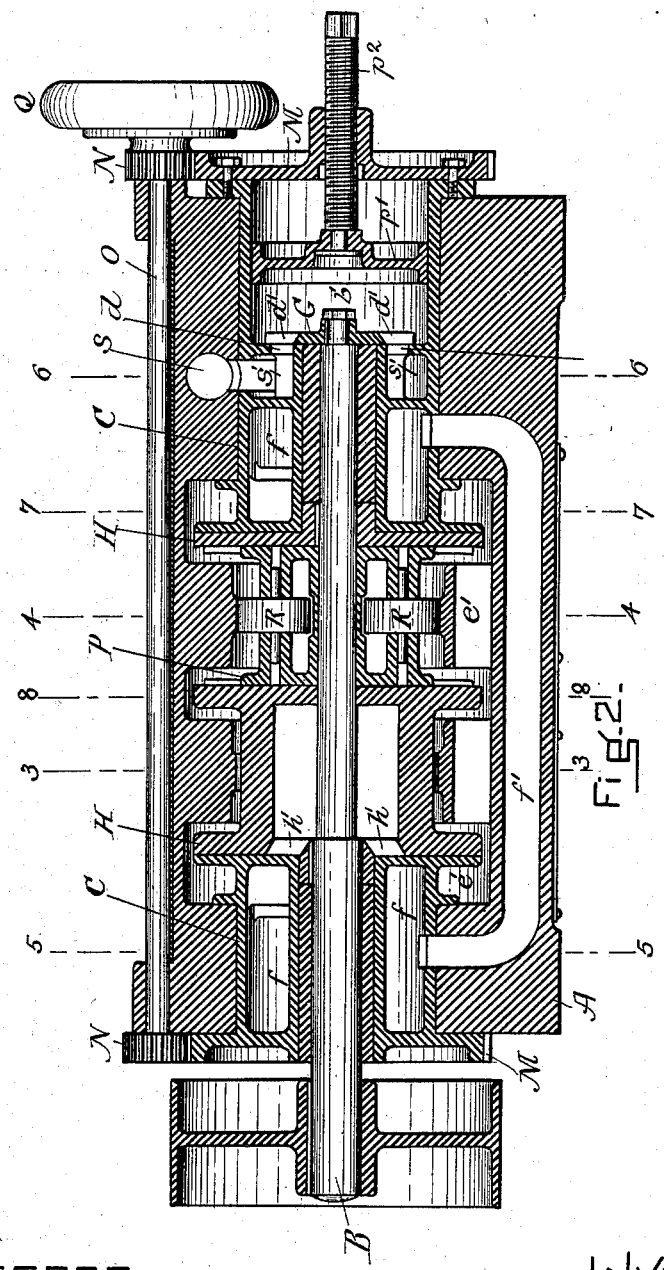
Figure 3:
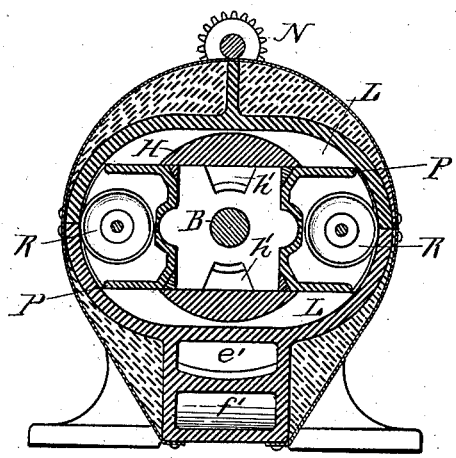
Figure 4:
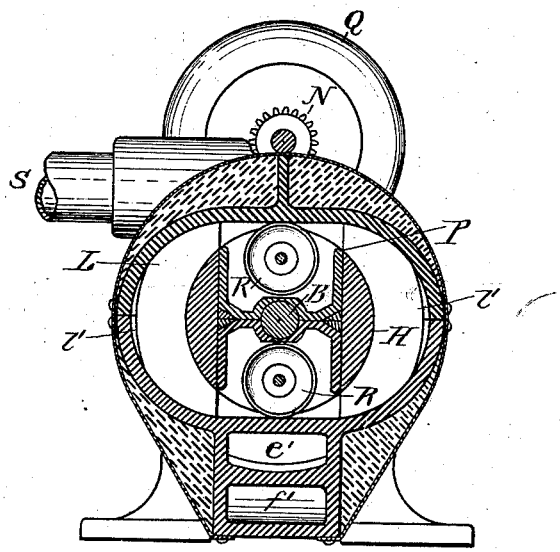
Figure 5:
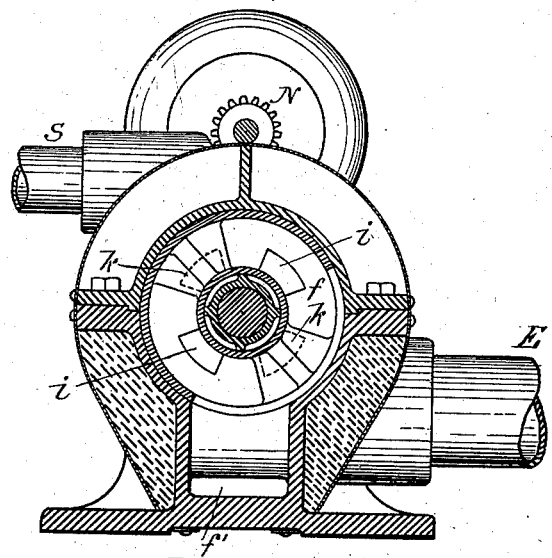
Figure 6:
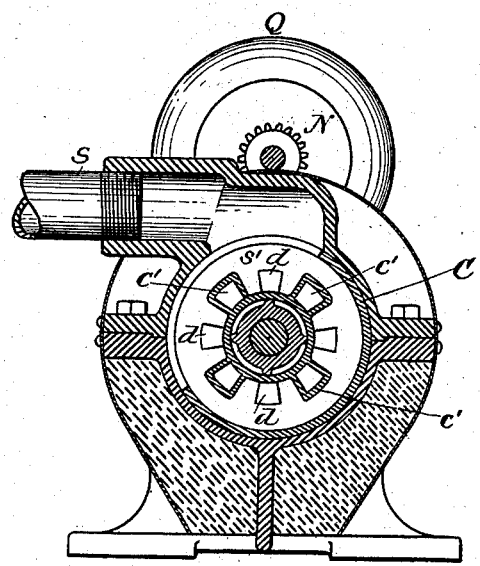
Figure 7:
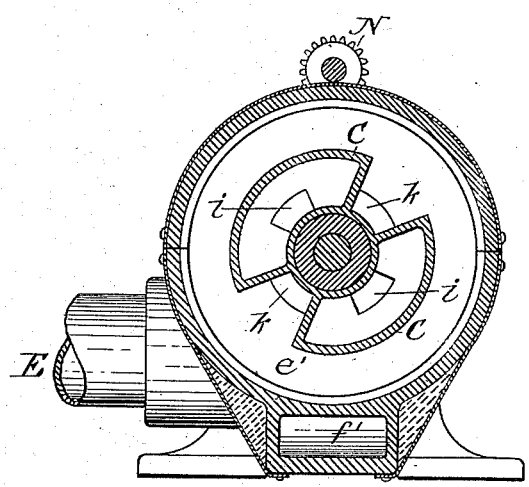
Figure 8:
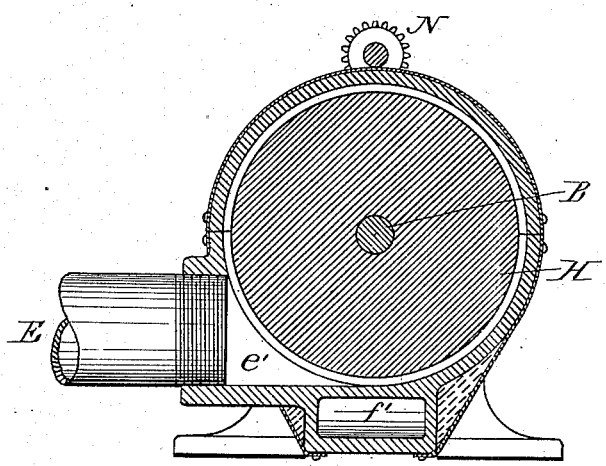
Figure 11:
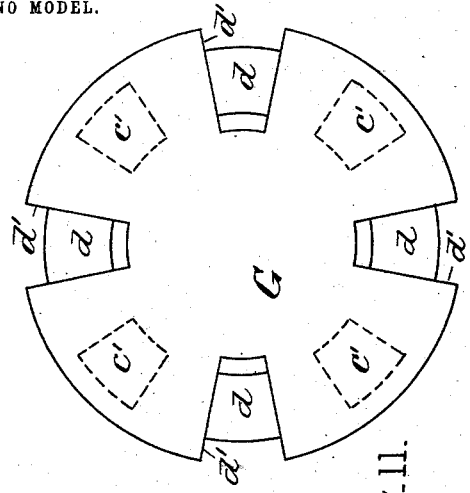
Figure 12:
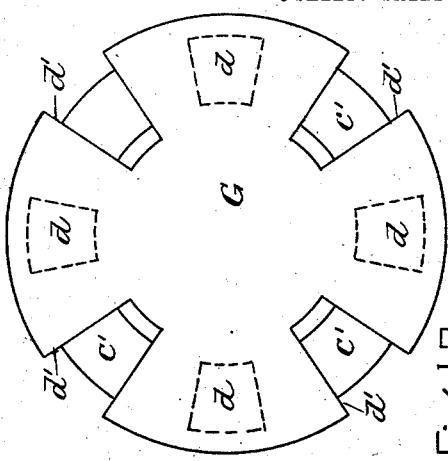
Figure 9:
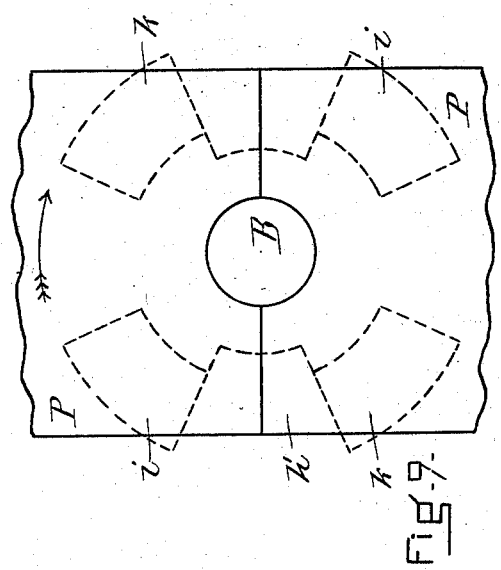
Figure 10:
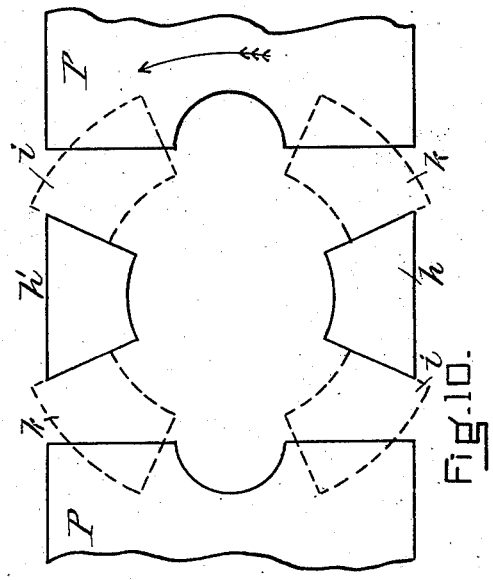

Figure 1 is an elevation of the moving parts of the engine with duplicate cylinders and with the frame or casing in section. Fig. 2 is a longitudinal section of the entire engine. Fig. 3 is a cross-section of the engine on line 3 3, Fig. 2. Fig. 4 is a cross-section on line 4 4, Fig. 2. Fig. 5 is a cross-section on line 5 5, Fig. 2. Fig. 6 is a cross-section on line 6 6, Fig. 2, looking toward the right. Fig. 7 is a cross-section on line 7 7, Fig. 2, looking toward the left. Fig. 8 is a cross-section on line 8 8, Fig. 2. Fig. 9 is a diagram showing the two pistons closed together and the relative positions of the steam-ports in the piston-carrier and the steam-valve. Fig. 10 is a diagram showing the two pistons forced apart by the steam and the relative positions of the steam-ports. Fig. 11 is a diagram showing the movable part of the steam-valve in position to admit steam from the boiler to the steam-chest. Fig. 12 is a diagram showing the movable part of the valve in position to admit steam from the steam-chest to the engine.

Referring to the drawings, A is the engine-casing; B, the shaft upon which is secured the hub or piston-carrier H. This hub, as shown, is double and has two wide diametrical slots through it at an angle of ninety degrees to each other, in each of which a piston P is supported and slides, and each of which pistons has a wheel or roll R journaled in its outer end. In each end of the hub H are two diametrically opposite steam-ports $h'$, and in the cylindrical casings C, in which are the bearings for the shaft B, there are steam-passages $f$, from which open other ports $i$ at the ends next to the piston-carrier H, and when the ports $h'$ therein are coincident with the ports $i$ steam will be admitted between the pistons P and force them outward. Still other ports $k$ in the same end of the casings C open to other passages therein, which are connected with the exhaust-pipe E through the chamber $e'$, and when the ports $h'$ are coincident with the ports $k$ steam will be exhausted from the chamber between the pistons.

S is the steam-pipe, leading from the boiler, and it opens to the cylindrical valve-chamber $s'$, (see Figs. 2 and 6,) from which through ports $d$ and openings $d'$ in a rotating valve G, which is secured to the end of shaft B, steam is admitted to the steam-chest $b'$ four times during each rotation of the valve G. Alternating with the ports $d$ around the end wall of the chamber $s'$ are ports $c'$, which open into passages $f$ at the right-hand end of the engine, Fig. 2, and therefore as the valve G rotates the openings $d'$ therein alternately pass the ports $d$ and then the ports $c'$, thus admitting steam from the chamber $s'$ to the steam-chest $b'$ and then from the chest $b'$ to the passage $f$. The size of the steam-chest $b'$ may be varied by moving the piston $p'$ in or out by means of the screw $p^2$. The passages $f$ at the two ends of the engine are connected by a passage $f'$, so that steam will be supplied to the space between the pistons P in both chambers simultaneously.

When it is desired to reverse the rotation of the engine, the relative positions of the ports $i$ and $k$ therein may be changed by turning the casings C a quarter-rotation. This is accomplished by the large gears M on the ends of the casings C and the pinions N on the shaft O, which may be turned by the hand-wheel Q.

The piston-chambers L (see Figs. 3 and 4) are cylindroids of ellipsoidal form in cross-section, and in the form illustrated the curve of the interior at $l'$ upon each side of the ends of the transverse or major axis is substantially semicircular, which I have found to be the curve that produces the least shock when the pistons change direction in each reciprocatory movement. It will be observed that the line of reciprocation of the piston, which may be indicated as the straight line which passes through the axes of the two rollers R, always passes through the axis of the shaft B, which is also the axis of the ellipsoidal interior of the chamber L, and during each reciprocal movement of the pistons this line is angularly inclined to that radius of the roller R which is normal to the interior of the chamber at its point of contact therewith, and such line of reciprocation of the pistons is normal to the curve of the interior or at right angles to the tangent of such curve at four points only—namely, when that line is coincident with the transverse or longest diameter and with the conjugate or shortest diameter of the ellipsoid, which are the positions in which the pistons are respectively shown in Figs. 3 and 4 and which are the points at which the direction of movement of the pistons changes in each reciprocation. By reason of this inclination of the direction of thrust of the pistons P against the interior surface of their chamber L when steam is admitted between the pistons the wheels R in one chamber are caused to roll over the surface from the position shown in Fig. 4 to that shown in Fig. 3, and thereby turn the hub H and shaft B. At the same time steam is being exhausted from between the pistons in the other chamber L and those pistons are pushed together by the contact of their rolls R against the walls of the chamber corresponding to the next quarter-section of its periphery, which brings those pistons to the position shown in Fig. 4. Steam is then admitted between these latter pistons, and they are forced outward against the walls of the chamber, thereby giving the engine another quarter-turn and at the same time pushing the pistons of the companion chamber together again, and thus the two sets of pistons alternate in the work done. When but one chamber L and one set of pistons are employed, a suitable fly-wheel should be used to carry the hub H, with the pistons, around from the position shown in Fig. 3 to that shown in Fig. 4.

The manner in which the valve G operates to admit steam to the steam-chest $b'$ and then from there to the passages $f$ is shown in the diagrams Fig. 11 and Fig. 12, In the former the ports are open to admit steam to the chamber $b'$ and in the latter from that chamber to the passages $f$. Also in Figs. 9 and 10 is illustrated the manner in which steam is alternately admitted between the pistons to force them outward and exhausted therefrom when the pistons are pushed together. The ports $i$ $i$ and $k$ $k$ are in the end of the casing C and are stationary when the engine is running, while the ports $h'$ $h'$ are in the end of the hubs H and revolve past the ports $i$ and $k$.

In Fig. 9 suppose the hub and pistons P to be revolving as indicated by the arrow. As soon as the ports $h'$ begin to overlap the ports $i$ steam will be admitted between the pistons and they will be forced outward. As soon as the ports $h'$ have passed the ports $i$ they immediately begin to overlap the ports $k$, and the steam between the separated pistons will be exhausted and the pistons will be pushed together, and as the hub rotates these operations will alternate with one another twice for each pair of pistons during each rotation of the engine.

In Fig. 10 the casing C is illustrated as having been given a quarter-turn, so as to substitute the positions of the ports $i$ and $k$ one for the other, and thus reverse the direction of rotation of the engines. The pistons are there shown separated, and as the hub with its ports $h'$ turn, as indicated by the arrow, they will first overlap the ports $k$, and the steam will be exhausted.

If only one piston is to be used in each carrier, a fixed abutment corresponding to the inner end of the companion piston will be placed in each slot in the carrier H, and the single piston in each chamber will be located diametrically opposite to that in the other instead of at an angle of ninety degress, as in the case where a pair of pistons is employed in each slot.

It will be understood that a greater number of diametrical slots than is shown may be made in a carrier H in series along the shaft B, each with one or more pistons in it, and in that manner increase the power of the engine; but for ordinary uses and convenience in size an engine with two piston-chambers with a pair of pistons in each, as illustrated, will be found practically effective.

The advantages of this engine are that in relation to the size of the engine it has large steam capacity for each revolution and small loss from friction. There is perfect balance of pistons and their carrier in every position; also, there is small "clearance" between the valves and pistons, and by making the engine double, as shown, great power is obtained.

I claim—

1. In a rotary motor, the combination of a cylindroidal piston-chamber, a rotatable piston-carrier therein, a slot for the pistons extending entirely through the carrier and diametrically thereof, a pair of pistons adapted to slide radially in opposite directions in said slot and each of a length equal to the radius of the carrier, and a port to admit steam between the contiguous ends of the pistons to force them outward.

2. In a rotary motor, the combination of a cylindroidal piston-chamber, the surfaces at the ends of the longest diameter of which are semicircular and the intermediate portions plane surfaces which are tangent to the semicircles, a rotatable hub therein which has a chamber for the pistons extending entirely through it diametrically, and a pair of uniform pistons within the chamber adapted to be forced radially therein, in opposite directions, by the admission of steam between their contiguous ends.

3. In a rotary motor, the combination of two cylindroidal piston-chambers with their respective longest dimensions, which are diametrical to the motor-shaft, at right angles to each other, a rotary piston-carrier in each chamber, a diametrical slot for the pistons in each carrier, a pair of oppositely-sliding pistons in each slot, and a port to admit and exhaust motive fluid at the outer end of each cylindroidal chamber.

4. In a rotary motor, a rotary disk-valve provided with ports which alternately admit steam from the boiler to the steam-chest and from the steam-chest to the engine four times during each rotation of the engine-shaft.

MARGARET E. KNIGHT.

Witnesses:
R. L. ROBERTS,
F. A. COLLINS.